United States Patent
Keyes, Sr.

(10) Patent No.: US 8,468,677 B2
(45) Date of Patent: Jun. 25, 2013

(54) WATER SPREAD LIMITING SYSTEM FOR PRE-INSULATED PIPING

(75) Inventor: Thomas Joseph Keyes, Sr., Fort Worth, TX (US)

(73) Assignee: Thermacor Process, LP, Fort Worth, TX (US)

( * ) Notice: Subject to any disclaimer, the term of this patent is extended or adjusted under 35 U.S.C. 154(b) by 793 days.

(21) Appl. No.: 12/701,172

(22) Filed: Feb. 5, 2010

(65) Prior Publication Data

US 2011/0192585 A1 Aug. 11, 2011

(51) Int. Cl.
*B23P 11/00* (2006.01)
*F28F 7/00* (2006.01)
*F16L 9/14* (2006.01)

(52) U.S. Cl.
USPC .................. 29/525.14; 165/185; 138/149

(58) Field of Classification Search
USPC ............... 29/524.14, 525.13, 428, 516, 510, 29/506, 272, 282; 165/185; 138/149, 148, 138/113, 112
See application file for complete search history.

(56) References Cited

U.S. PATENT DOCUMENTS

| | | | | |
|---|---|---|---|---|
| 4,415,184 | A * | 11/1983 | Stephenson et al. | 285/47 |
| 6,142,359 | A * | 11/2000 | Corbishley et al. | 228/104 |
| 6,978,807 | B1 | 12/2005 | Keyes | |
| 7,028,717 | B1 | 4/2006 | Keyes | |
| 7,143,788 | B2 | 12/2006 | Keyes | |
| 7,418,979 | B2 | 9/2008 | Keyes | |
| 2011/0192486 | A1 * | 8/2011 | Keyes | 138/149 |

* cited by examiner

*Primary Examiner* — John C Hong
(74) *Attorney, Agent, or Firm* — Charles D. Gunter, Jr.

(57) ABSTRACT

A section of pipe is used in a pre-insulated piping system where the system is made up of lengths of insulated and jacketed pre-insulated piping. Each length of piping is made up of an inner carrier pipe having an interior surface and an exterior surface. An envelope of foamed insulation surrounds the inner pipe exterior surface and an outer protective jacket surrounds the envelope of foamed insulation. The length of piping has a joining end for joining to an adjacent length of piping, whereby the adjacent lengths of piping provide a continuous length of fluid conduit for conveying high temperature fluids. A heat dissipating element surrounds the inner carrier pipe for at least a portion of the length thereof. The heat dissipating element is itself insulated, whereby any water which penetrates the outer protective jacket contacts the heat dissipating element and is cooled below boiling before traveling any significant distance along the length of the section of piping.

6 Claims, 4 Drawing Sheets

WATER SPREAD LIMITING SYSTEM FOR PRE-INSULATED PIPING

BACKGROUND OF THE INVENTION

1. Field of the Invention

The present invention relates to pre-insulated piping systems, and more specifically to a method for countering the deleterious effects which can occur in the case of a breakdown of the piping insulation in the presence of water or other contaminants.

2. Description of the Prior Art

There are many instances in which insulated pipelines are needed. For example, distributed HVAC (heating, ventilation and air conditioning) applications utilize chilled water for cooling and steam or superheated water for heating. For convenience in the discussion which follows, steam and superheated water will be referred to collectively as "steam." The chiller and boiler are typically contained in a central location and the chilled water and steam are distributed to other locations. For example, on a school or college campus, the chiller and boiler may be located in a power plant building. The chilled water and steam are distributed to classrooms in separate buildings.

A set of insulated pipelines is used to convey the chilled water from the chiller to other locations and back to the chiller. Another set of insulated pipelines is used to carry the steam from the boiler to the other locations and back to the boiler. The insulated pipelines are usually located underground.

Pre-insulated pipe is conventional and commercially available. There are predominately two types of such piping systems in use: Class-A drainable dryable testable (DDT); and polyurethane or polyisocyanurate "bonded" foam systems. Both of these systems use an inner "carrier pipe" to convey fluid. Although steel is the most commonly used material for the inner pipe which carries the media to be piped, copper or aluminum or other metals as well as fiberglass, PVC, and similar materials may be utilized, as well. Around the outside of the steel carrier pipe is a layer of insulating foam such as, for example, polyisocyanurate foam. Around the outside of the foam is a protective jacket of hard thermoplastic (such as high density polyethylene, HDPE). The foam has set up or cured within the outer jacket so as to bond to the jacket and to the inner pipe. The plastic jacket protects the foam from mechanical damage and also provides a water tight seal to prevent corrosion of the steel pipe. In the bonded type system, the foam and outer jacket, being bonded, do not move relative to the inner pipe. In the Class-A type system, on the other hand, the insulated inner pipe is designed to move independently of the associated outer jacket. In fact, there is an air gap between the inner pipe and outer carrier pipe in the class-A type system.

Despite the advances which have been made in pre-insulated piping systems in recent years, a need continues to exist for further improvements. For example, ground water is the enemy of all systems, but especially high temperature foam systems carrying fluids at over 212° F. The outer protective jacket of the insulated pipeline may, on occasion, be punctured or breached inadvertently as by maintenance or construction operations. This can occur where another utility line is being installed in the immediate vicinity, for example. If the outer protective jacket is penetrated for any reason, ground water and water vapor may enter the piping system and contact the inner carrier pipe, causing the water to boil. This boiling water attacks the outer foam insulation which surrounds the inner carrier pipe. This leads to deterioration of the foam and results in a bare pipe with huge energy loses, destruction of above ground grass, shrubbery, etc.

Perhaps even more commonly, the integrity of the pipeline is compromised because the installing contractor fails to properly install the seal at the joint location in the pipeline. Water then enters at the joint location and makes its way to the hot carrier pipe.

Problems are also exacerbated when pipeline maintenance personnel fail to act promptly to remedy breaches which have occurred in the surrounding insulation and protective jacket of the pipeline. Electrical monitoring systems will typically alert maintenance personnel to the fact that a leak exists. However, the maintenance staff may put off repairing the joint or other fault until, for example, the weather improves.

Pipe sections of the type under consideration are typically on the order of forty feet in length. As has been discussed, while a breach in the outer protective jacket can occur at any point along the length of piping, faults in the piping system most typically occur at the pipe ends where the connecting joints are located. When water penetrates the outer foam layer and contacts the hot inner metal carrier pipe, it starts to boil. The boiling water deteriorates the surrounding foam and can continue to travel for great lengths, eating up an entire pipeline.

Steps can be taken in an attempt to prevent external intrusion into the protective jacket of the insulated pipeline. For example, in the case of adjacent utility work, above ground markers, surveying tools, and the like can be used to help avoid contact with the underground insulated pipeline.

Additional training and education of the installing contractors and facility maintenance personnel can also help to prevent problems which lead to premature failure of the pipeline.

Despite attempts to prevent damage of the above type, however, there continues to exist a need for a system for mediating the effect of any breach or breakdown in the integrity of the outer protective jacket of such pre-insulated piping systems and in improving the integrity of the joint closures at the field joints in the piping system.

There continues to exist a need for such a system which would help to insure that any water which penetrates the outer jacket is prevented from boiling and traveling down the pipeline for any significant distance as a boiling liquid.

SUMMARY OF THE INVENTION

The present invention has as its object to provide a pre-insulated piping system having an internal water spread limiting element or mechanism present on at least selected lengths of the piping which limits the amount of damage which can be caused by water which may breach the piping system.

The particular type of piping system under consideration includes lengths of insulated and jacketed pre-insulated piping and, more specifically to a bonded foam pre-insulated piping system; i.e., the piping is made up of an inner carrier pipe having an interior surface and an exterior surface with an envelope of foamed insulation surrounding the inner pipe exterior surface. The envelope of foamed insulation can be, for example, an insulating material selected from the group consisting of polyurethane foams and high temperature polyisocyanurate foams. An outer protective jacket surrounds the envelope of insulation. The outer jacket can conveniently be formed from high density polyethylene. Each length of piping has a joining end for joining to an adjacent length of piping, whereby the adjacent lengths of piping provide a continuous length of fluid conduit for conveying high temperature fluids.

The water spread limiting element or mechanism preferably comprises a heat dissipating element which surrounds the inner carrier pipe for at least a portion of the length thereof, the dissipating element being itself insulated. For example, the heat dissipating element can be a cylindrical metal sleeve having a metal end cap or fixture which is welded at one end to the inner carrier pipe. The sleeve has an internal diameter which is spaced apart a selected length from the exterior surface of the inner carrier pipe. The internal diameter of the cylindrical metal sleeve is itself filled with insulation. The insulation may be the same type foam that is normally used to surround the inner metal carrier pipe.

The cylindrical metal sleeve which is welded at one end to the inner carrier pipe extends for a selected length to an opposite free end thereof. The selected length is calculated to provide a desired degree of heat loss of so that any intruding water penetrating the outer protective jacket rapidly loses heat as it travels along the length of the heat dissipating element. Any boiling water rapidly ceases to boil and to extensively damage the surrounding insulating foam. Also, the inner carrier pipe itself is completely isolated from any invading water at least along a portion of its length where it is surrounded by the heat dissipating sleeve.

The section of piping, as previously described, is installed in a piping system made up of other sections of piping. However, not all of the sections of piping in the piping system will necessarily include the feature of a heat dissipating element surrounding the inner carrier pipe.

A method of limiting water damage in a section of pre-insulated piping used in a pre-insulated piping system is also described. A first and second length of insulated and jacketed pipe are provided as previously described. The special heat dissipating element is located on the exterior of the inner carrier pipe, as has been described. The heat dissipating element is itself insulated, as by injecting the uncured high temperature foam into the space created by the internal diameter of the heat dissipating element and the exterior of the inner carrier pipe and allowing the foam to cure. In this way, any water which penetrates the outer protective jacket contacts the heat dissipating element and is cooled below boiling before traveling any significant distance.

Additional objects, features and advantages will be apparent in the written description which follows.

DETAILED DESCRIPTION OF THE INVENTION

The preferred version of the invention presented in the following written description and the various features and advantageous details thereof are explained more fully with reference to the non-limiting examples included in the accompanying drawings and as detailed in the description which follows. Descriptions of well-known components and processes and manufacturing techniques are omitted so as to not unnecessarily obscure the principle features of the invention as described herein. The examples used in the description which follows are intended merely to facilitate an understanding of ways in which the invention may be practiced and to further enable those skilled in the art to practice the invention. Accordingly, the examples should not be construed as limiting the scope of the claimed invention.

Figure 1:
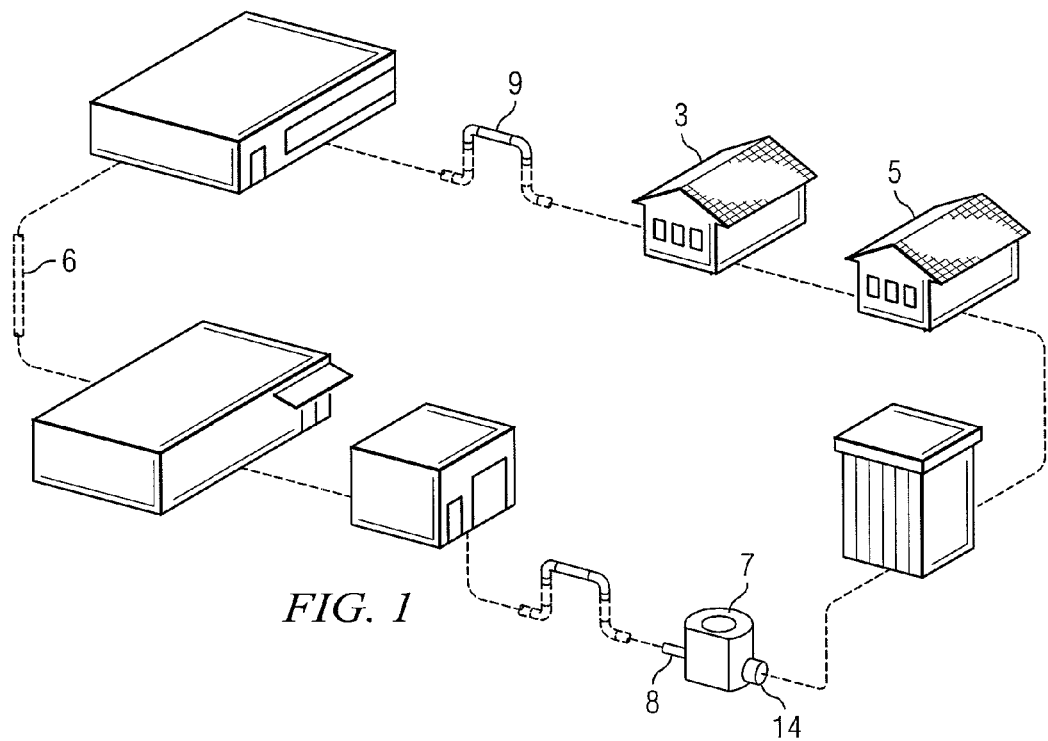
FIG. 1 is a simplified representation of a typical distributed HVAC system of the type under consideration which might utilize a high temperature fluid, such as steam, for heating.
Figure 2:
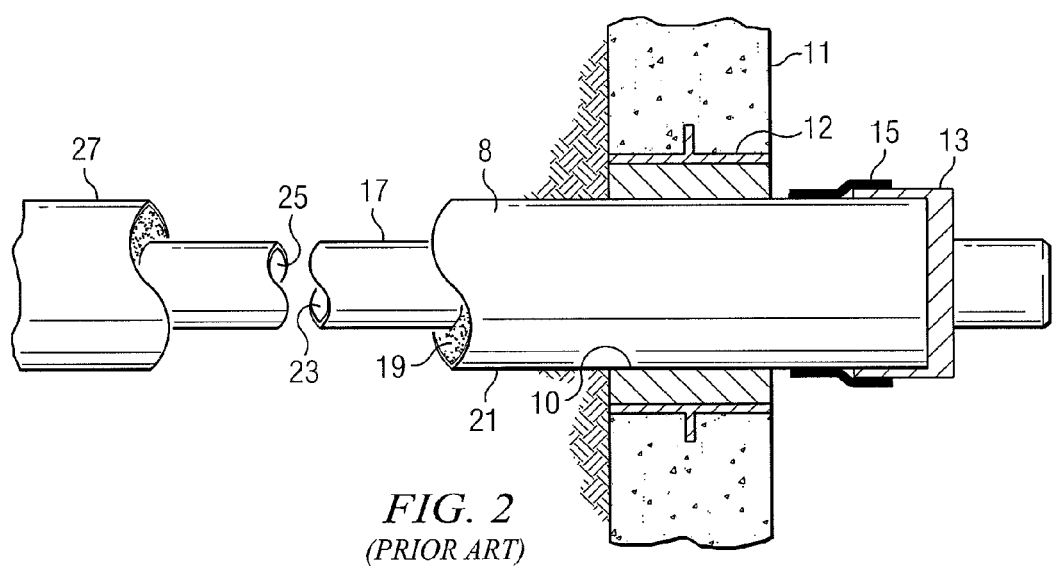
FIG. 2 is a simplified view of a prior art section of pre-insulated piping of the type under consideration, shown partly broken away for ease of illustration, in a typical arrangement where the pipeline enters an underground valve pit or building wall, the wall being shown in section.

Turning first to FIGS. 1-2, there is illustrated a typical environment in which the pre-insulated piping systems of the invention might be employed. FIG. 1 shows a school campus having a number of isolated buildings 3, 5 connected by an underground insulated pipeline carrying steam which includes sections of straight run pipe 6 and which, at points, includes right angle loops or elbows 9. The sections of pipe which make up the straight runs of piping may be on the order of forty feet in length. The loops 9 are provided in a typical piping system of the type illustrated in order to compensate for expansion and contraction forces which are exerted on the piping. The piping system will also typically include one or more manholes or "valve pits" 7. The valve pits 7 are typically formed of cast concrete and include portholes (10 in FIG. 2).

FIG. 2 is a simplified schematic intended to illustrate the general environment of the piping used in the present invention. FIG. 2 shows the wall of a valve pit with a section of pre-insulated piping 8 terminating in the pit. The section of piping 8 passes through concrete wall 11 where it is sealed with a conventional wall sleeve and seal 12 and terminates in a steel water shed ring 13. A sleeve of heat shrink tape 15 seals the steel ring 13 to the pipe exterior. The pre-insulated section of piping 8 includes an inner pipe 17, typically formed of steel, an envelope of foamed insulation 19 surrounding the inner pipe and outer protective jacket 21 surrounding the envelope of insulation. The joining ends (shown generally as 23, 25 in FIG. 2) of adjacent pipe lengths are affixed, as by being welded together and are then covered with insulating layers and an outer jacket similar to the remainder of the length of pipe. The welded pipe ends form fixed joints, whereby the adjacent pipe lengths provide a continuous fluid conduit for conveying high temperature fluids. The outer protective jacket 21 in FIG. 2 is typically formed of high density polyethylene (HDPE) or a similar polyolefin type material. The following references, among others, teach the manufacture of such prior art systems: U.S. Pat. No. 3,793, 4111; U.S. Pat. No. 4,084,842; and U.S. Pat. No. 4,221,405, all to Stonitsch et al.; as well as U.S. Pat. No. 6,547,908 and U.S. Pat. No. 5,736,715, both assigned to Thermacor Process, Inc., the assignee of the present invention.

The above described pre-insulated piping systems are well known in the industry at the present time. However, various environmental factors can act to affect the integrity of such systems. For example, a manufacturing defect or an installation defect can compromise the integrity of the system, as previously described. Similarly, at a later date, the outer protective jacket can be cut due to maintenance crews installing additional underground utilities. If the outer protective jacket is compromised for any reason where the system is carrying steam above 212° F., boiling water can attack the foam and ultimately the inner steel carrier pipe. One of the principal objectives of the present invention is to prevent or mitigate any damage that might be caused by the penetration of the outer protective jacket of the piping system or failure of the piping at a faulty joint closure.

The reference in this discussion to pipe "lengths" is intended to refer to standard available factory pre-insulated piping of the type previously described having an inner metal pipe surrounded by an envelope of foamed insulation, which in turn, is contained within a polyolefin jacket. As referred to briefly above, typical commercial practice involves the use of steel, copper, aluminum or alloy metal material for the inner carrier pipes. For high temperature systems, the surrounding envelope of foam insulation is typically formed of closed cell polyisocyanurate. The outer protective jacket can be formed of a suitable polyolefin, such as polypropylene, polybutylene, polyethylene, polyvinylchloride and similar protective jackets.

The term "high temperature", as used in this discussion, means that the pipelines are conveying fluids at temperatures above ambient, typically at temperatures of 212° F. and above. In some cases, temperatures of 350° F. and higher will be encountered. The expected operating temperature of the pipeline will determine the type of outer foam insulation utilized. For example, 250° F. is the present temperature limitation at which polyurethane foam is used in bonded foam systems. Temperatures above about 250° F. require the use of higher temperature foams, such as the previously mentioned polyisocyanurate foam. The piping systems of the type illustrated in the drawings and described in the discussion which follows are typically utilized to convey fluids at high temperature and/or pressures. For example, a typical steam line might be conveying fluid at, for example, 250-350° F.

The present invention is an enhancement or improvement to presently available pre-insulated bonded foam piping of the type which is commercially available and familiar to those in the relevant industries. Prior art pipe lengths of this general type are commercially available as standard factory type product. For example, such product is available from Thermacor Process, LP of Fort Worth, Tex., assignee of the present invention. One typical example is sold commercially as the HT-406 High Temp Steel Piping System.

Figure 3:
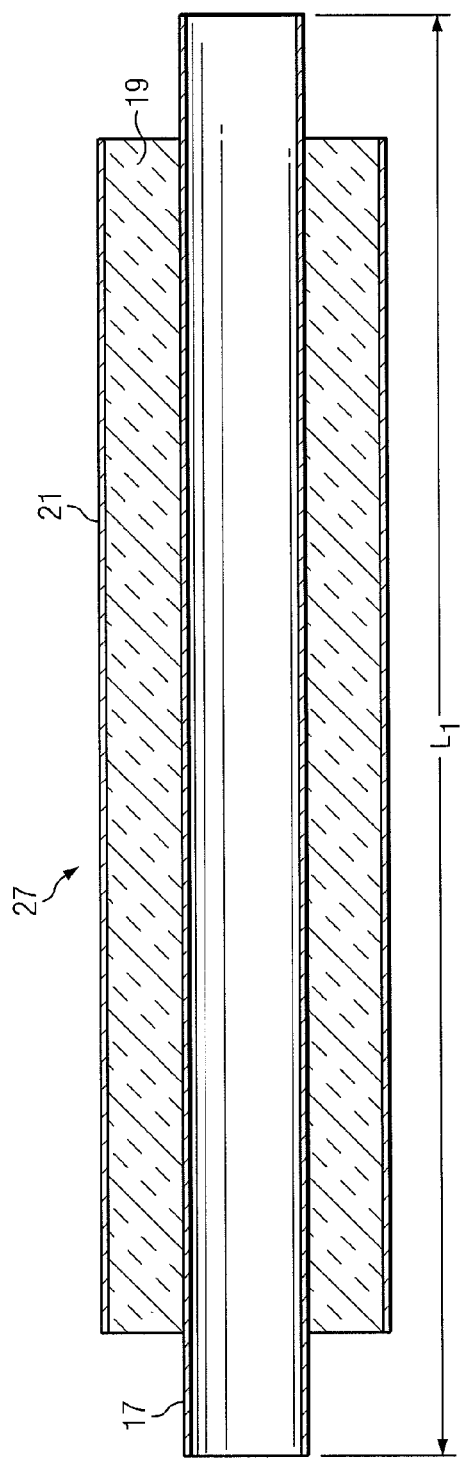
FIG. 3 is side view of a straight run section of traditional pre-insulated piping, the insulating layers being shown in section.

FIG. 3 is a simplified side view of a section of conventional pre-insulated piping 27, with the layer of foam insulation 19 and outer protective HDPE jacket 21 shown in section. The length "L₁" of the section of piping is approximately forty feet in this case. While it is theoretically possible that the outer protective jacket 21 might be damaged and penetrated at any point along the length of the piping, breaches or assembly defects most often occur at the point of the fixed joints at the pipe ends where, for example, a pipe end 23 is welded to an adjacent pipe end 25 (illustrated at 23, 25 in FIG. 2).

Figure 4:
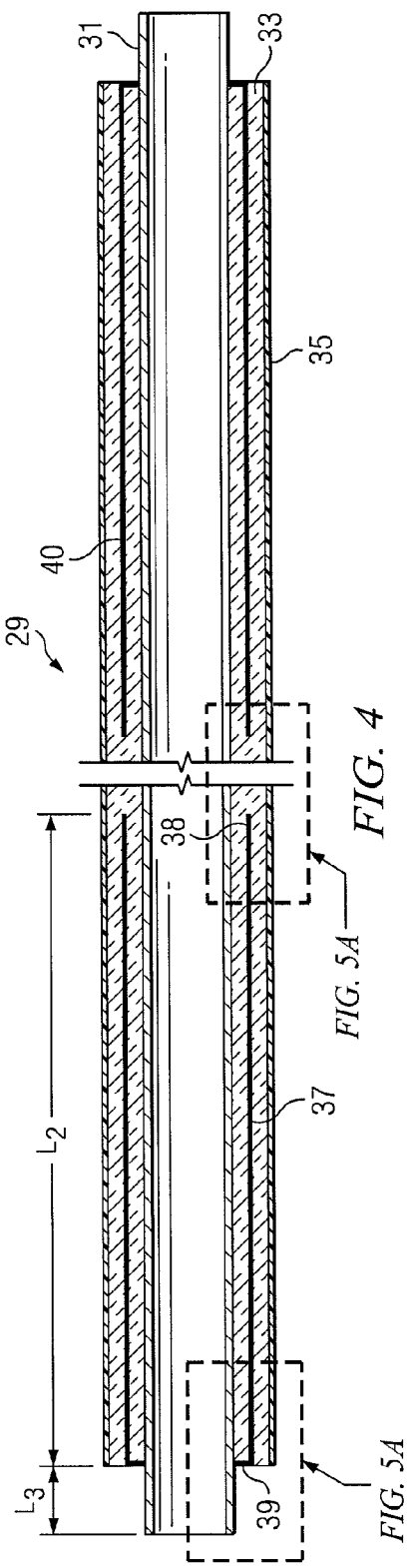
FIG. 4 is a view similar to FIG. 3, but showing the improved section of pre-insulated piping of the invention having the special water limiting feature.

FIG. 4 is a side view, similar to FIG. 3, of the improved section of piping of the invention. The section of piping 29 again is made up of a centrally located, inner steel carrier pipe 31. The inner carrier pipe 31 is surrounded by an envelope of foam insulation 33 which, in turn, is surrounded by an outer HDPE jacket 35. However, as will be appreciated from FIGS. 4 and 5, in this case there is a special heat dissipating element 37 surrounding the inner carrier pipe 31 for at least a portion of the length thereof. In the preferred form of the invention shown in FIGS. 4 and 5, the heat dissipating element 37 is a cylindrical metal sleeve having a water limiting device, such as the metal end cap 39, which is welded at one end to the inner carrier pipe. The cylindrical sleeve 37 has an internal diameter 41 which is spaced apart a selected distance from the exterior surface (43 in FIG. 5) of the inner carrier pipe. The sleeve also terminates in an opposite end 38 which is open.

The same sleeve arrangement, oppositely arranged, is located at the opposite end of the section of piping 29, as illustrated generally at 40 in the drawings.

Figure 5A:
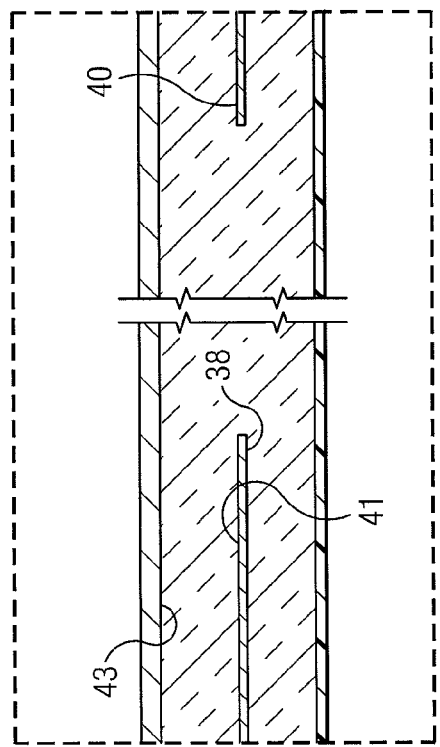
FIG. 5A, 5B is a partial sectional view of one region of the improved section of pre-insulated piping of FIG. 4 shown in enlarged scale for ease of illustration.
Figure 5B:
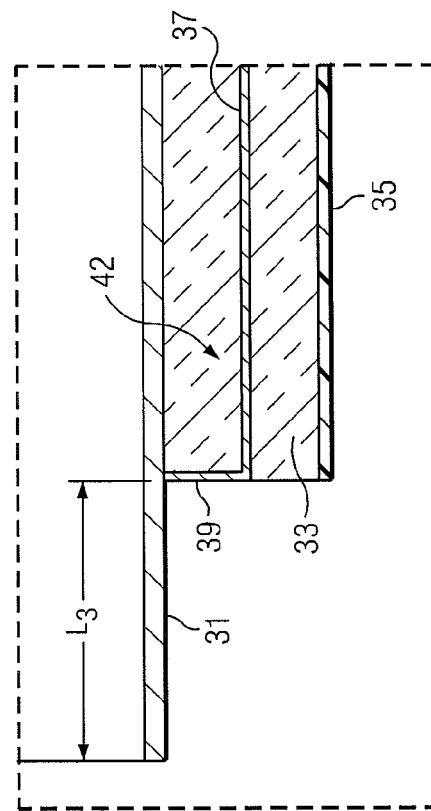

As will be apparent from FIGS. 4 and 5, the region 42 which is enclosed by the heat dissipating element 37 is itself insulated whereby any water which penetrates the outer protective jacket 35 and which contacts the heat dissipating element 37 is cooled below boiling before traveling any significant distance along the length of the section of piping from the joint location. The insulating material for the region enclosed by the heat dissipating element can conveniently be the same high temperature polyisocyanurate foam which is used as the outer insulating layer 19. The high temperature polyisocyanurate foam might be, for example, injected into the space in an uncured state and allowed to cure. It is also possible that other types of insulating materials such as mineral wool or calcium silicate might be employed, as well, in some specialized applications.

It can be seen from FIG. 4 that the cylindrical metal sleeve 37 is afixed, as by welding at one end to the inner carrier pipe 31 and that it extends for a selected length "L₂" to an opposite free end thereof. The selected length "L₂" between the selected ends of the sleeve is calculated to provide a desired degree of heat loss of any boiling water created by contact between intruding water penetrating the outer protective jacket 35 and the inner carrier pipe 31.

Figure 6:
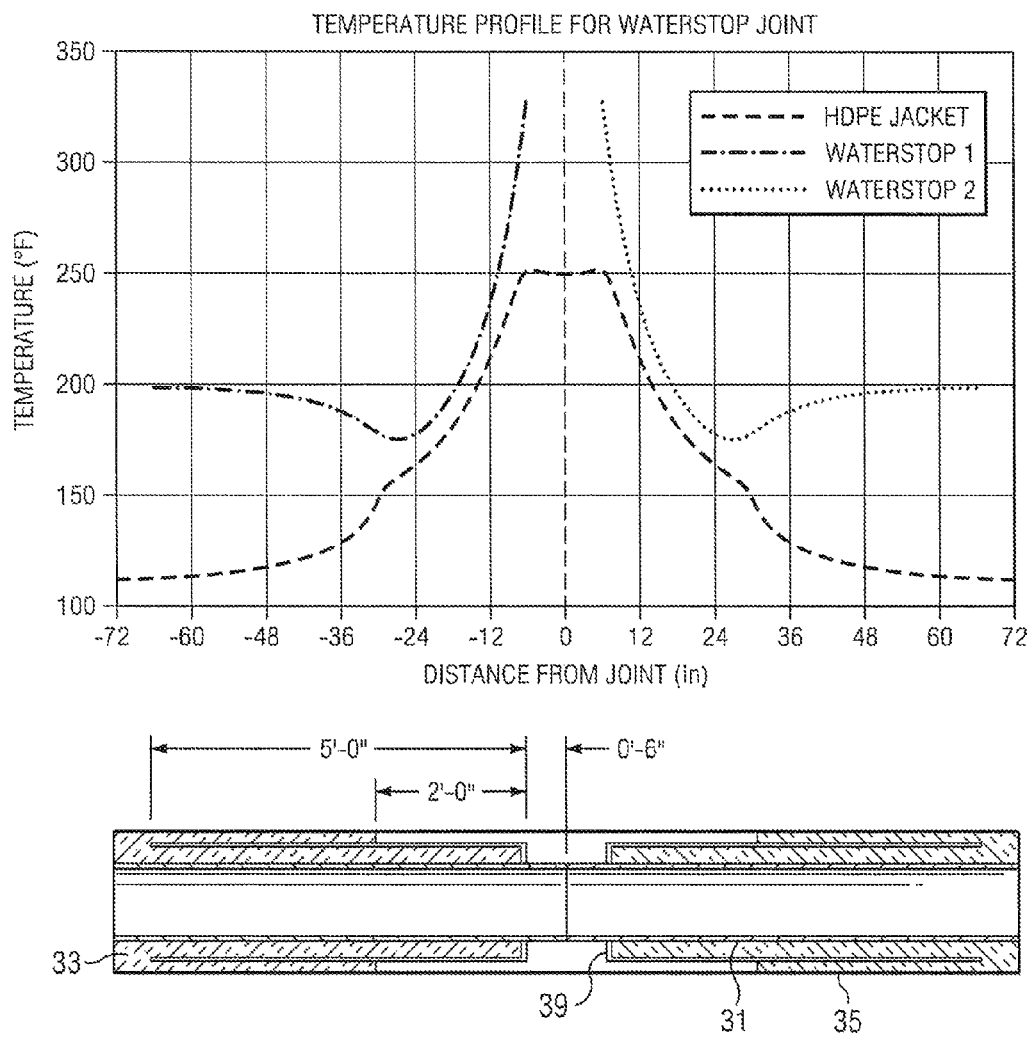
FIG. 6 is a side sectional view of a section of the improved pre-insulated piping of the invention, similar to FIG. 4, but with a temperature profile graph overlaid above the drawing to better illustrate the temperature limiting effect of the water spread limiting feature of the invention.

With reference briefly to FIG. 6 of the drawings, a section of the pre-insulated piping of the invention, similar to the one shown in FIG. 4, is overlaid with a graph showing the temperature profile taken along the outer cylindrical metal sleeve 37 as measured from the welded end plate 39 with the location of the end plate 39 being at zero inches. As will be apparent from the accompanying graph, the temperature profile drops to below 200° F. approximately 10 inches from the welded end plate 39. At some point along the length of the sleeve 37, the temperature gradually increases as the distance from the end plate 39 increases, but the temperature remains below the boiling point of water. FIG. 6 also illustrates the temperature of the outer HDPE protective jacket, the temperature profile also being overlaid over the schematic of the section of pipe.

To take an actual case example, the section of piping 29 might be on the order of 40 feet in length. For a 6 inch carrier pipe 31, there might be 3 inches of foam insulation on each side of the carrier pipe so that the outer diameter of the pipe at the outer protective jacket is approximately 12.8 inches in diameter. Assume that a bad field joint exists in the first 6 inches of the section of piping at the joining end (illustrated at "L₃" in FIGS. 4 and 5) which allows water to penetrate the outer protective jacket at that point. In the case of the prior art section of pipe illustrated in FIG. 3, the intruding water would contact the hot carrier pipe 17 and start to boil. The boiling water would then begin to deteriorate the foam insulation on either side gradually traveling down the entire section of pipe.

Because the special heat dissipating element (sleeve 37) is located about the exterior of the carrier pipe in the section of pipe illustrated in FIG. 4 and because of the water limiting end cap 39, water is prevented from entering the enclosed space between the sleeve and the carrier pipe. Water may travel over the top of the sleeve and start to travel down the length of the sleeve. However, as illustrated by the graph in FIG. 6, the water temperature quickly falls below 212° F. (boiling point of water) and ceases to boil. In other words, the small area adjacent the pipe joint is the only heat driver for creation of boiling water. As the water cools, it becomes much less damaging to the surrounding foam insulation 33.

The contractor will typically be monitoring the pipeline electronically with an electronic leak detection system, as is conventional in the industry. The breach in the outer jacket will be noted and the joint can be scheduled for replacement or repair at a convenient time, i.e., after the ground thaws in the case of the winter months in parts of the country. A new joint closure can typically be provided to secure the section of pipe without the necessity of shutting down the entire pipeline.

It may not be necessary to incorporate the special water spread limiting feature of the invention into every section of pipe used in the piping system but it will typically be present at each field joint location. Also, the special heat dissipating element surrounding the inner carrier pipe will typically extend for only a portion of the length of the section of piping, as is illustrated in FIG. 4 of the drawings.

A method is also shown for limiting water damage in a section of pre-insulated piping used in a pre-insulated piping system, of the type described. The special heat dissipating element is located about the exterior of at least selected sections of pipe and extends along a portion of the length thereof. An envelope of foamed insulation is then applied about the inner carrier pipe and about the heat dissipating element so that the envelope surrounds the exterior surface of the inner carrier pipe. The layer of foamed insulation is allowed to cure and is itself enclosed by an outer protective HDPE Adjacent ends of pipe in the piping system are welded together at the adjacent joining ends thereof to form fixed joints, whereby the adjacent pipe lengths provide a continuous fluid conduit for conveying high temperature fluids. The heat dissipating element is itself insulated by the foam insulation, whereby any water which penetrates the outer protective jacket contacts the heat dissipating element and is cooled below boiling before traveling any significant distance along the length of the section of piping.

An invention has been provided with several advantages. By incorporating the water spread limiting device of the invention in a pre-insulated pipeline of the type under discussion, the effects of boiling water on the system are mediated, typically limiting the effect to a small area adjacent the joining ends of two sections of pipe which make up a pipe joint. Any boiling water intruding at this point travels only a fixed length or distance down the internal cylindrical sleeve before becoming cooled to a non-boiling and less damaging state. The system incorporates several existing, commercially available materials or components, thereby simplifying manufacture and assembly. The water spread limiting device is relatively simple in design and economical to thereby implement in a variety of pre-insulated piping installations.

While the shown has been shown in only one of its forms, it is not thus limited but is susceptible to various change and modifications without departing from the spirit thereof.

What is claimed is:

1. A method of limiting water damage in a section of pre-insulated piping used in a pre-insulated piping system, the section of piping having an inner metal carrier pipe for conveying hot fluids, a surrounding layer of foam insulation and an outer protective jacket, which method contains the ingress of water or other contaminants in the case of a breach in the outer jacket, the method comprising the steps of:

providing a first and second length of insulated and jacketed pipe, each having a joining end to be joined to an end of the other length, each pipe length comprising an inner metal pipe having an interior surface and an exterior surface;

locating a heat dissipating element about the exterior surface of the inner carrier pipe along at least a portion of the length thereof;

applying an envelope of foamed insulation about the inner carrier pipe and about the heat dissipating element so that the envelope surrounds the exterior surface of the inner carrier pipe;

enclosing the layer of foamed insulation with an outer protective jacket which surrounds the envelope of insulation;

welding together adjacent joining ends of adjacent pipe lengths to form fixed joints, whereby the adjacent pipe lengths provide a continuous fluid conduit for conveying high temperature fluids;

the heat dissipating element itself being insulated by the foam insulation, whereby any water which penetrates the outer protective jacket contacts the heat dissipating element and is cooled below boiling before traveling any significant distance along the length of the section of piping.

2. The method of claim 1, wherein the heat dissipating element is a cylindrical metal sleeve having a metal end cap which is welded at one end to the inner carrier pipe, the sleeve having an internal diameter which is spaced apart a selected length from the exterior surface of the inner carrier pipe.

3. The method of claim 2, wherein the envelope of foamed insulation surrounding the inner pipe exterior surface is a high temperature polyisocyanurate foam.

4. The method of claim 3, wherein the internal diameter of the cylindrical metal sleeve is itself filled with foam insulation.

5. The method of claim 4, wherein the cylindrical metal sleeve which is welded at one end to the inner carrier pipe extends for a selected length to an opposite free end thereof, the selected length between the selected ends thereof being calculated to provide a desired degree of heat loss of any boiling water created by contact between intruding water penetrating the outer protective jacket and the inner carrier pipe.

6. The method of claim 5, wherein the end of the cylindrical metal sleeve which is welded to the inner carrier pipe is located adjacent a respective joining end of the pipe which is used for form a fixed joint in the piping system.

* * * * *